US009928176B2

(12) United States Patent
Moyer

(10) Patent No.: US 9,928,176 B2
(45) Date of Patent: Mar. 27, 2018

(54) SELECTING CACHE TRANSFER POLICY FOR PREFETCHED DATA BASED ON CACHE TEST REGIONS

(71) Applicant: Advanced Micro Devices, Inc., Sunnyvale, CA (US)

(72) Inventor: Paul James Moyer, Fort Collins, CO (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 25 days.

(21) Appl. No.: 15/215,033

(22) Filed: Jul. 20, 2016

(65) Prior Publication Data

US 2018/0024931 A1 Jan. 25, 2018

(51) Int. Cl.
*G06F 12/08* (2016.01)
*G06F 12/0862* (2016.01)

(52) U.S. Cl.
CPC .. *G06F 12/0862* (2013.01); *G06F 2212/6026* (2013.01)

(58) Field of Classification Search
None
See application file for complete search history.

(56) References Cited

U.S. PATENT DOCUMENTS

| 5,293,609 | A | * | 3/1994 | Shih | G06F 12/0862 |
| | | | | | 711/136 |
| 5,513,336 | A | * | 4/1996 | Vishlitzky | G06F 12/0862 |
| | | | | | 711/113 |
| 5,544,342 | A | * | 8/1996 | Dean | G06F 9/3802 |
| | | | | | 711/119 |
| 5,553,276 | A | * | 9/1996 | Dean | G06F 9/3871 |
| | | | | | 712/E9.063 |
| 6,223,256 | B1 | * | 4/2001 | Gaither | G06F 12/126 |
| | | | | | 711/118 |
| 6,272,598 | B1 | | 8/2001 | Arlitt et al. | |
| 6,272,622 | B1 | * | 8/2001 | Han | G06F 12/0862 |
| | | | | | 711/E12.057 |
| 2003/0005232 | A1 | | 1/2003 | Guthrie et al. | |
| 2006/0004963 | A1 | * | 1/2006 | Mattina | G06F 12/084 |
| | | | | | 711/130 |
| 2009/0113135 | A1 | | 4/2009 | Cain et al. | |
| 2014/0129779 | A1 | | 5/2014 | Frachtenberg et al. | |
| 2015/0269075 | A1 | | 9/2015 | Galchev et al. | |

OTHER PUBLICATIONS

International Search Report and Written Opinion dated Oct. 25, 2017 for PCT/US17/042794, 12 pages.

* cited by examiner

*Primary Examiner* — Kevin Verbrugge

(57) ABSTRACT

A processor applies a transfer policy to a portion of a cache based on access metrics for different test regions of the cache, wherein each test region applies a different transfer policy for data in cache entries that were stored in response to a prefetch requests but were not the subject of demand requests. One test region applies a transfer policy under which unused prefetches are transferred to a higher level cache in a cache hierarchy upon eviction from the test region of the cache. The other test region applies a transfer policy under which unused prefetches are replaced without being transferred to a higher level cache (or are transferred to the higher level cache but stored as invalid data) upon eviction from the test region of the cache.

21 Claims, 5 Drawing Sheets

SELECTING CACHE TRANSFER POLICY FOR PREFETCHED DATA BASED ON CACHE TEST REGIONS

BACKGROUND

Description of the Related Art

To improve memory access efficiency, many processors employ a memory hierarchy, whereby a processor includes one or more caches to store a subset of data stored in main memory. The criterion for which subset of data from the main memory is stored in the cache can vary depending on the processor design, but typically prioritizes the caching of data that has recently been accessed. In addition, some processors employ one or more prefetchers that predict data that is likely to be accessed by the processor in the near future, and copies that data from main memory to the one or more caches. In order to move new data into the one or more caches, the processor selects previously stored data for eviction based on a specified replacement scheme, but conventional replacement schemes can result in undesirably low memory access efficiency.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
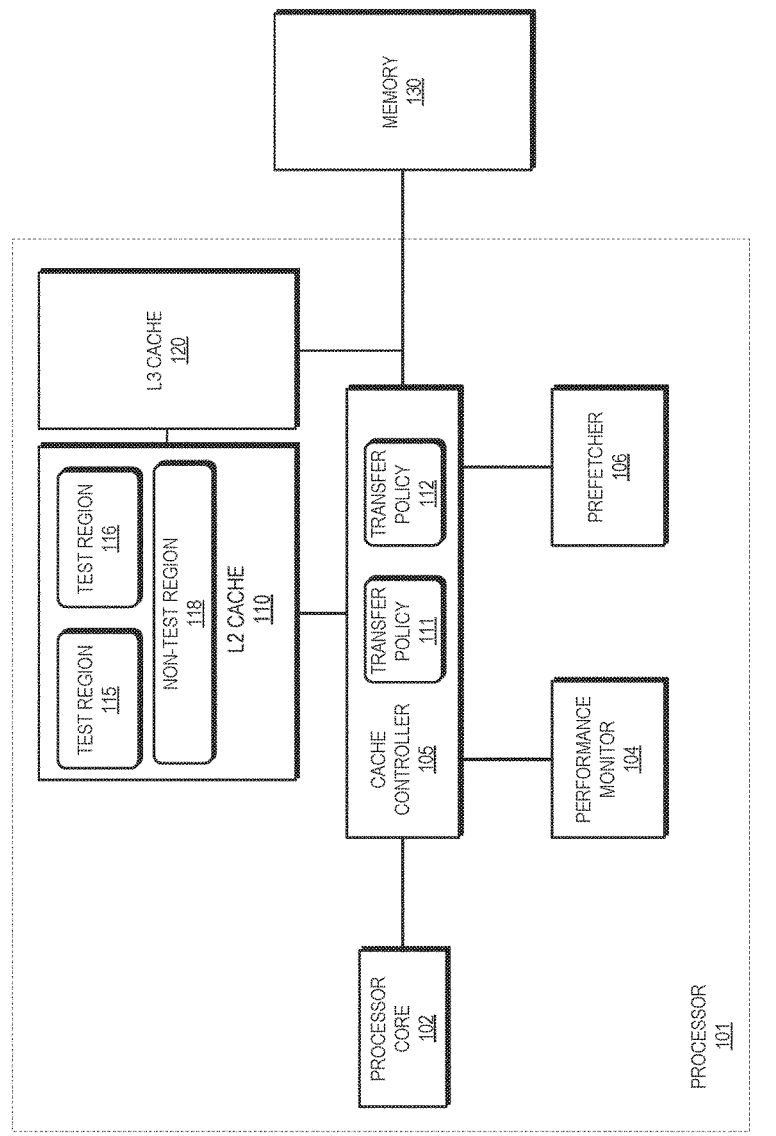
FIG. 1 is a block diagram of a processing system that applies a transfer policy to a portion of a cache based on access metrics for different test regions of the cache in accordance with some embodiments.

FIGS. 1-5 illustrate techniques for applying a transfer policy to a portion of a cache based on access metrics for different test regions of the cache, wherein each test region applies a different transfer policy for data in cache entries that were stored in response to a prefetch requests but were not the subject of demand requests (referred to as "unused prefetches" or "unused prefetched data"). One test region applies a transfer policy under which unused prefetches are transferred to a higher level cache in a cache hierarchy upon eviction from the test region of the cache. The other test region applies a transfer policy under which unused prefetches are replaced without being transferred to a higher level cache (or are transferred to the higher level cache but stored as invalid data) upon eviction from the test region of the cache. By selecting a cache transfer policy for the non-test portion of the cache based on access metrics for the different test regions, the cache dynamically changes the transfer policy to the more efficient policy for the pattern of instructions currently executing at a processor.

To illustrate via an example, in some embodiments the cache has two test regions and a non-test region, whereby all the regions are employed by the cache to store data in response to demand requests from a processor and in response to prefetch requests from a prefetcher. The cache employs different transfer policies for the different test regions, such that for one of the test regions the cache transfers to a higher level cache evicted cache entries that store unused prefetches. For the other test region, the cache replaces evicted cache entries that store unused prefetches without transferring the data to a higher level cache, or transfers the data to the higher level cache but stores the data as invalid data. The processor monitors access metrics for each of the test regions, such as a cache hit rate, cache miss rate, or a combination thereof. Based on the access metrics, the processor selects the transfer policy for one of the test regions and applies it to the non-test region of the cache. For example, if the cache hit rate is higher for one of the test regions, the processor applies the transfer policy for that test region to the non-test region of the cache, thereby improving the hit rate for the cache overall.

As used herein, the term "transfer policy" refers to how data stored in a cache entry is handled upon eviction from the cache. The transfer policy may require that all unused prefetches are to be transferred to and stored as valid data at a higher level cache upon eviction from the cache. Another transfer policy mandates that all unused prefetches are to be discarded upon eviction from the cache. In some embodiments, the prefetch data is discarded by replacing the data at the cache without transferring the data to the higher level cache. In some other embodiments, the prefetch data is discarded by providing the data to the higher level cache but storing the data at the higher level cache with an indicator that the data is invalid, so that the data can be replaced by valid incoming data during cache entry replacement at the higher level cache.

FIG. 1 illustrates a processing system 100 that applies a cache transfer policy for unused prefetches to a portion of a cache based on access metrics for different test regions of the cache in accordance with some embodiments. The processing system 100 is generally configured to execute sets of instructions organized in the form of computer programs in order to carry out tasks on behalf of an electronic device. Accordingly, the processing system 100 may be used in any of a variety of electronic devices, such as a desktop or laptop computer, server, smartphone, tablet, game console, and the like.

To facilitate execution of instructions, the processing system 100 includes a processor 101 and memory 130. The processor 101 includes a processor core 102, a cache controller 105, an L2 cache 110, and an L3 cache 120. In some embodiments, each of the modules of the processor 101 are formed on the same semiconductor die to form at least a portion of a processor core 102, and the memory 130 is formed on a different semiconductor die and connected to the processor 101 via one or more busses or signal lines. In some embodiments, at least a portion of the memory 130 is formed on the same semiconductor die as modules of the processor 101.

The L2 cache 110, L3 cache 120 and the memory 130 are each memory devices generally configured to store data, and therefore may be random access memory (RAM) memory modules, non-volatile memory devices (e.g., flash memory), and the like. As described further herein, the L2 cache 110, L3 cache 120 and the memory 130 form a memory hierarchy for the processing system 100. In addition, the memory hierarchy of the processing system 100 may include other memory modules, such as additional caches not illustrated at FIG. 1.

The processor core 102 includes an instruction pipeline having, for example, a fetch stage to fetch instructions, a decode stage to decode each fetched instruction into one or more operations, execution stages to execute the operations, and a retire stage to retire instructions whose operations have completed execution. One set of operations generated based on the instructions are referred to herein as memory access instructions, and are requests to load data (load operations) from the memory hierarchy of the processing system 100, and requests to store data at the memory hierarchy of the processing system 100. Memory access requests generated by the processor core 102 represent requests to load or store data that are being used or are known to be needed by an executing program, and are referred to herein as demand requests.

The cache controller 105 is a module generally configured to manage the memory hierarchy of the processing system 100 by moving data between the L2 cache 110, the L3 cache 120, and the memory 130. In particular, the L2 cache 110 and L3 cache 120 are memory devices, each of which includes a plurality of entries, whereby each entry is associated with one or more addresses of the memory 130. In response to a memory access request, the cache controller 105 reviews the data stored at one or more entries of the L2 cache 110 to determine if any of the entries stores data associated with the memory address targeted by the memory access request. If so, the cache controller 105 indicates a cache hit and satisfies the memory access request at the identified entry, either by storing data at the entry (in the case of a store operation) or by providing the data at the identified entry to the processor core 102 (in the case of a load operation).

If data associated with the memory address is not stored at an entry of the L2 cache 110, the cache controller 105 indicates a cache miss and issues a request to the L3 cache 120. In response to the memory access request, the cache controller 105 (or, in some embodiments, a separate cache controller) reviews the data stored at one or more entries of the L3 cache 120 to determine if any of the entries stores data associated with the memory address targeted by the memory access request. If so, the cache controller 105 indicates a cache hit and satisfies the memory access request at the identified entry, either by storing data at the entry (in the case of a store operation) or by providing the data at the identified entry to the L2 cache 110, from which it is subsequently provided to the processor core 102 (in the case of a load operation). If data associated with the memory address is not stored in an entry of the L3 cache 120, the cache controller 105 indicates a cache miss and issues a request to the memory 130 for the data at the memory address. Upon receipt of the data from the memory 130, the cache controller 105 stores the data at an entry of the L3 cache 120, from which it is subsequently transferred to the L2 cache 110, which in turn provides the data to the processor core 102, thus satisfying the memory access request.

To support improved memory access efficiency, the processor 101 includes a prefetcher 106 that monitors demand requests issued to the cache controller 105 to identify patterns and predict, based on the identified patterns, memory addresses that will be the target of demand requests by the processor core 102 in the near future. The prefetcher 106 issues to the cache controller 105 memory access requests, referred to herein as prefetch requests, targeting the identified memory addresses. The cache controller 105 treats a prefetch request similar to a demand request by first identifying if data associated with the memory address targeted by the prefetch request is already stored at an entry of the L2 cache 110 and, if not already stored, requesting the data from the L3 cache 120 or the memory 130 and storing the data at an entry of the L2 cache 110.

In some embodiments, each entry of the L2 cache 110 and L3 cache 120 is associated with a subset of memory addresses and only data associated with that subset is permitted to be stored at the entry. For example, in some embodiments the cache is an N-way set associative cache having M sets and each of the M sets including N entries. Each of the M sets is assigned a different subset of memory addresses, such that the cache controller 105 only stores data at an entry if the data is associated with a memory address in the entry's assigned subset. When all entries of a set store data (referred to herein as "valid data") that may be the target of a memory access, the set is referred to herein as full. Further, when the cache controller 105 receives data that is to be stored at a full set, it selects one of the entries of the set to evict (that is, to remove from the set) and replace with the received data. When an entry is evicted from the L2 cache 110, it may be transferred to the L3 cache 120, or it may be replaced without first being transferred to the L3 cache 120. The scheme that the cache controller 105 uses to select the entry for transfer or for replacement without transfer is referred to as the transfer policy for the L2 cache 110.

To facilitate more efficient transfer of evicted cache entries, the transfer policy for the L2 cache 110 may be based at least in part on whether the data stored at the cache entries was stored in response to a prefetch request but was not the subject of a demand request. Under one transfer policy, unused prefetches in the L2 cache 110 will be transferred to the L3 cache 120 with a valid status upon eviction from the L2 cache 110. Under a different transfer policy, unused prefetches in the L2 cache 110 are transferred to the L3 cache 120 with a status indicating that the data is invalid, and therefore is eligible to be discarded. Under yet another transfer policy, unused prefetches in the L2 cache 110 will be replaced without being transferred to the L3 cache 120 upon eviction from the L2 cache 110. Typically, data that was transferred to the L2 cache 110 in response to a prefetch request was previously transferred or copied from the L3 cache 120. In some embodiments, the L3 cache 120 is not inclusive of the L2 cache 110 such at least some of the cache entries stored in the L2 cache 110 are not also stored at the L3 cache 120. Transferring unused prefetched data to the L3 cache 120 upon its eviction from the L2 cache 110 where the L3 cache 120 is not inclusive of the L2 cache 110 may require the eviction of other valid data from the L3 cache 120, for example, if the set in the L3 cache 120 into which the unused prefetched data is assigned is full, and resulting in less efficient processing of memory requests. By optionally employing a transfer policy that transfers unused prefetched data to the L3 cache 120 with an invalid status or, alternatively, that replaces unused prefetched data upon its eviction from the L2 cache 110 without transferring the unused prefetched data to the L3 cache 120, more efficient processing of memory requests may be achieved. By contrast, in a conventional cache management system, unused prefetched data is transferred to the L3 cache 120 upon its eviction from the L2 cache 110 with a valid status, thereby potentially evicting more useful data (e.g., data that is more likely to be accessed than the unused prefetch data), reducing memory access efficiency.

In some embodiments, the cache controller 105 applies different transfer policies to different regions of the cache 110, wherein each region includes a plurality of entries. In at least one embodiment, each region only varies as to its transfer policy. Thus, the entries of a region may be used for any set, and different regions may include different entries of the same set.

In the depicted example of FIG. 1, the cache 110 includes three regions: test regions 115 and 116 and non-test region 118. In addition, the cache controller 105 stores transfer policies 111 and 112 that differ in at least one aspect, such as whether unused prefetched data is transferred to the L3 cache 120 upon eviction from the L2 cache 110 with a valid status or an invalid status or, alternatively, is replaced without being transferred to the L3 cache 120. Thus, in the example of FIG. 1, the transfer policy 111 mandates that upon eviction from the L2 cache 110, all or a portion of the unused prefetched data is transferred to the L3 cache 120 with a valid status, as is any non-prefetch request data. As used herein, a non-prefetch request refers to a memory access that is not a prefetch request targeted to the cache level to which the transfer policy is applied. Examples of non-prefetch requests include demand requests, memory access requests generated in response to instruction cache misses, hardware page table walk requests, speculative memory access requests generated by the processor core 102 (e.g., memory access requests generated during speculative execution of instructions after a branch instruction), and prefetch requests generated at other cache levels.

In contrast, the transfer policy 112 mandates that upon eviction from the L2 cache 110 all or a portion of the unused prefetched data is transferred to the L3 cache 120 with an invalid status or, alternatively, is replaced without being transferred to the L3 cache 120, whereas non-prefetch request data is transferred to the L3 cache 120 upon eviction from the L2 cache 110. The transfer policy 111 may therefore be more efficient for memory access patterns that more frequently access prefetched data, and the transfer policy 112 may be more efficient for memory access patterns that access prefetched data with less frequency. However, the memory access pattern for the processor core 102 may vary over time, such that the cache 110 operates more efficiently under different transfer policies at different times. Accordingly, for the non-test region 118, the cache controller 105 selects between the transfer policies 111 and 112 depending on performance characteristics of the test regions 115 and 116.

To illustrate, the processor 101 includes a performance monitor 104 that monitors and records performance characteristics, such as cache hit rate, cache miss rate, and the like, for each of the test regions 115 and 116. Based on one or more of the performance characteristics, or a combination thereof, of the test regions 115 and 116, the cache controller selects one of the transfer policies 111 and 112 and applies it to the non-test region 118. For example, if the cache hit rate for the test region 115 is higher than the cache hit rate for the test region 116, the cache controller 105 selects the transfer policy for the test region 115 (e.g., transfer policy 111) and applies it to the non-test region 118. In some embodiments, the non-test region 118 includes the majority of the entries of the cache 110. Thus, by selecting the transfer policy for the non-test region 118 as the more efficient transfer policy, as indicated by the performance of the test regions 115 and 116, the cache controller 105 enhances the overall efficiency of the cache 110. Further, as the performance characteristics of the test regions 115 and 116 change over time, the cache controller changes the transfer policy to the policy that is more efficient for a given set of performance characteristics.

Figure 2:
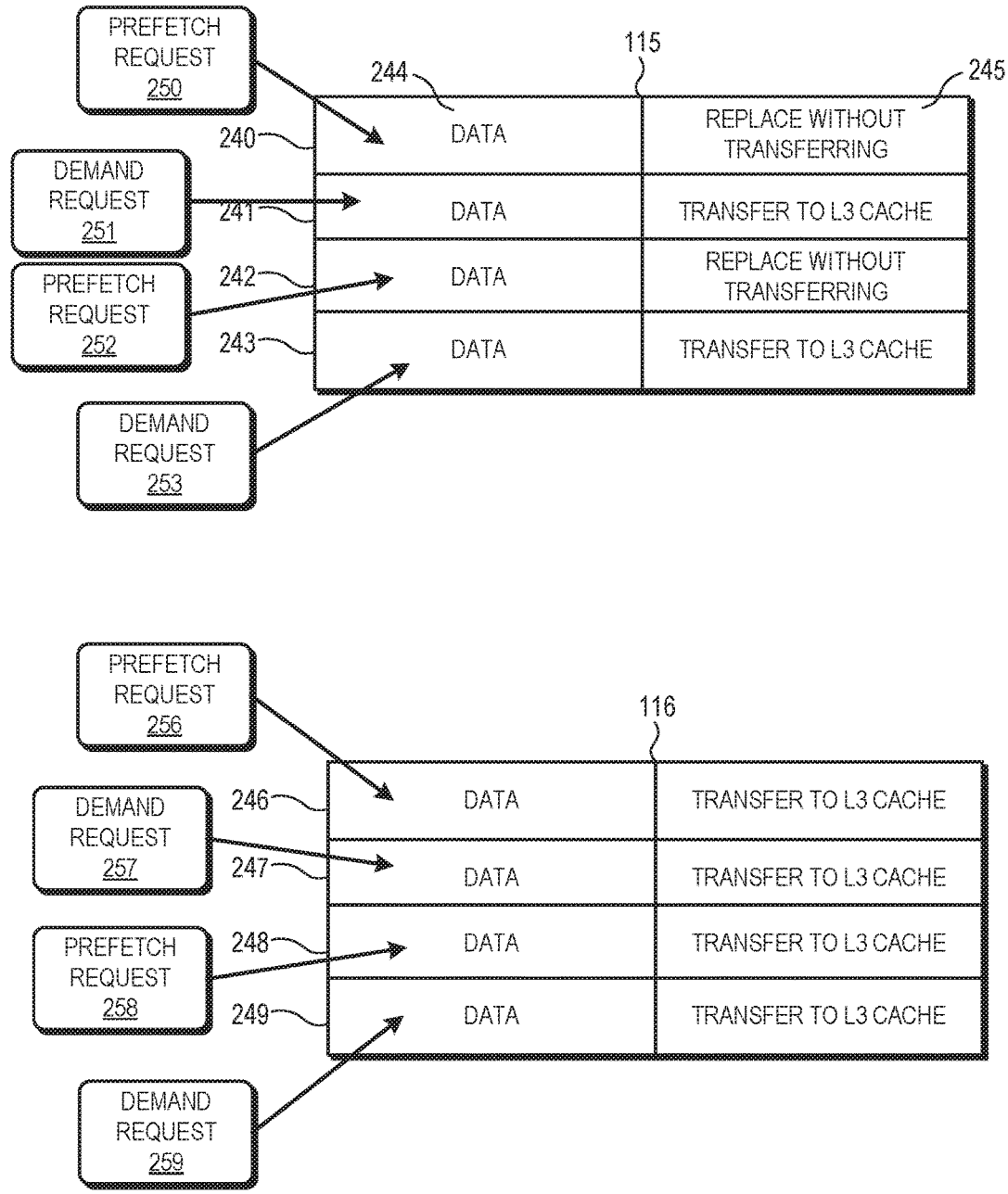
FIG. 2 is an example of the processing system of FIG. 1 employing different transfer policies in different test regions of the cache in accordance with some embodiments.

FIG. 2 illustrates an example of the cache controller 105 applying different transfer policies to the test regions 115 and 116 of the L2 cache 110 of FIG. 1 in accordance with some embodiments. In the depicted example, each of the test regions 115 and 116 includes a plurality of entries, such as entries 240, 241, 242, and 243 of test region 115 and entries 246, 247, 248, and 249 of test region 116. Each of the entries includes a data portion (e.g., data portion 244 of entry 240) to store data retrieved from the memory 130—that is, the data used to satisfy memory access requests at the entry. Each entry also includes a transfer field (e.g., transfer field 245 of entry 240) to store an indication of whether the transfer policy being applied to test region 115 mandates that the data be transferred to the L3 cache 120 or replaced without being transferred to the L3 cache 120 (or, alternatively, transferred with a status indicating that the data is to be discarded) upon eviction from the test region 115 of the L2 cache 110.

For the example of FIG. 2, it is assumed the cache controller 105 applies a transfer policy to the test region 115 wherein unused prefetch requests are replaced without first being transferred to the L3 cache 120 upon eviction from the test region 115 of the L2 cache 110, whereas demand requests are transferred to the L3 cache 120 upon eviction from the test region 115 of the L2 cache 110. In the example of FIG. 2, test region 115 of the L2 cache 110 is populated with data associated with prefetch requests 250 and 252, respectively, and data associated with demand requests 251 and 253, respectively.

As described above, the cache controller 105 applies different transfer policies to the different test regions 115 and 116. By measuring the performance characteristics for each test region, the cache controller 105 identifies the more efficient transfer policy for a recent memory access pattern of the processor core 102, and applies the more efficient transfer policy to the non-test region 118, thereby improving overall cache efficiency.

In some embodiments, instead of mandating replacement without transfer to the L3 cache 120 (or, alternatively, transfer to the L3 cache 120 with a status indicating that the data is to be discarded) for all unused data associated with prefetch requests, the transfer policy mandates replacement without transfer to the L3 cache 120 for a portion of the unused data associated with prefetch requests. For example, for the test region 115, the cache controller 105 applies a transfer policy pursuant to which only a percentage of entries associated with prefetch requests will be replaced without first being transferred to the L3 cache 120.

In contrast to the transfer policy applied to the test region 115, the transfer policy applied to the test region 116 mandates transfer with a valid status to the L3 cache 120 for each entry upon eviction from the L2 cache 110, without regard to whether the entry is associated with a demand request or a prefetch request. In the example of FIG. 2, test region 116 is populated with data associated with prefetch requests 256 and 258, respectively, and data associated with demand requests 257 and 259, respectively. In response to eviction of an entry of the test region 116, the cache controller 105 applies a transfer policy to require that the entry be transferred to the L3 cache 120, whether the data is associated with a demand request or a prefetch request. Thus, the different transfer policies applied to the different test regions 115 and 116 vary in one or more of several aspects, including whether all, some, or none of the entries associated with prefetch requests be replaced without first transferring to the L3 cache 120 upon eviction from the L2 cache 110. Further, in some embodiments the cache 110 includes more than two test regions, with different transfer policies applied to each test region, thereby giving the cache controller a wide range of possible transfer policies to apply to the non-test region 118.

Figure 3:
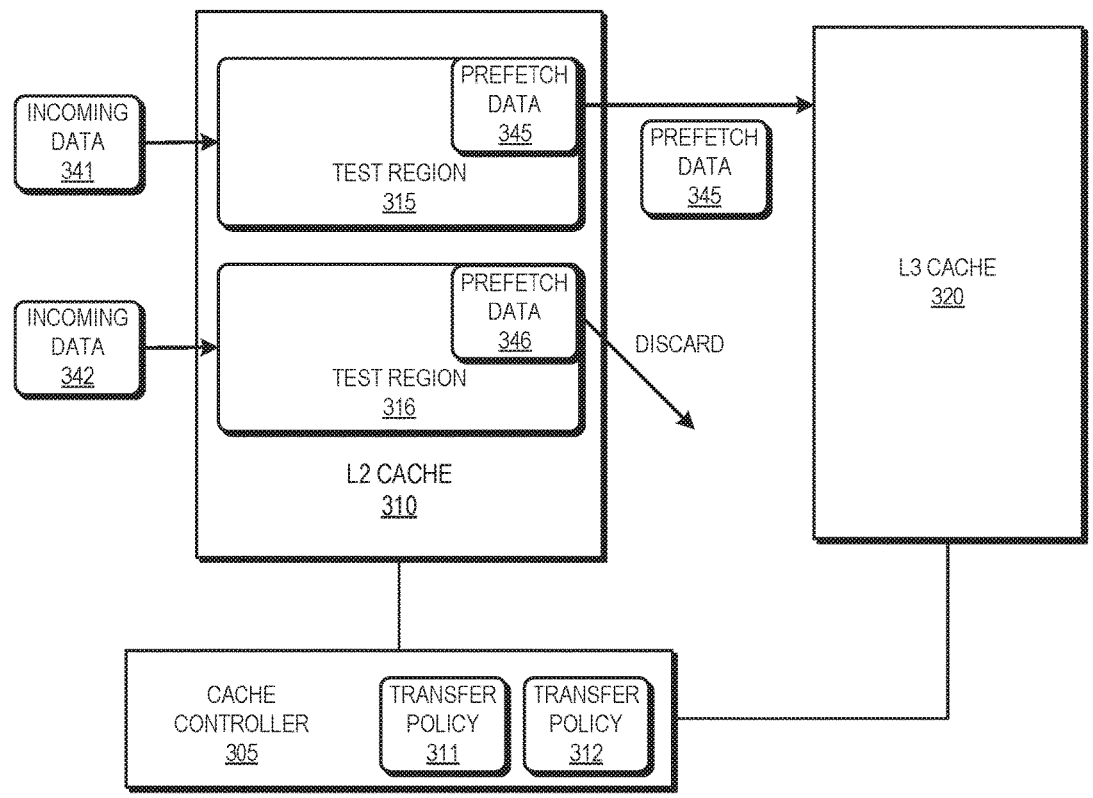
FIG. 3 is an example of the processing system of FIG. 1 employing different transfer policies in different test regions of the cache in accordance with some embodiments.

FIG. 3 illustrates an example of a cache controller 305 applying different transfer policies to different test regions of an L2 cache 310. In the example of FIG. 3, the cache controller 305 applies transfer policy 311 to test region 315 of the L2 cache 310, and applies transfer policy 312 to test region 316 of the L2 cache 310. Transfer policy 311 mandates that upon eviction from the L2 cache 310, all entries are to be transferred to the L3 cache 320, without regard to whether the entries are associated with prefetch requests or demand requests. In the example of FIG. 3, incoming data 341 is received into a set containing prefetch data 345 in test region 315 of the L2 cache 310, necessitating the eviction of prefetch data 345. Cache controller 305 applies transfer policy 311 to test region 315, and therefore transfers prefetch data 345 to the L3 cache 320 before replacing it with incoming data 341.

By contrast, incoming data 342 is received into a set containing prefetch data 346 in test region 316 of the L2 cache 310, necessitating the eviction of prefetch data 346. Cache controller 305 applies transfer policy 312 to test region 316, and therefore discards the prefetch data 346 without being transferring it to the L3 cache 320.

Figure 4:
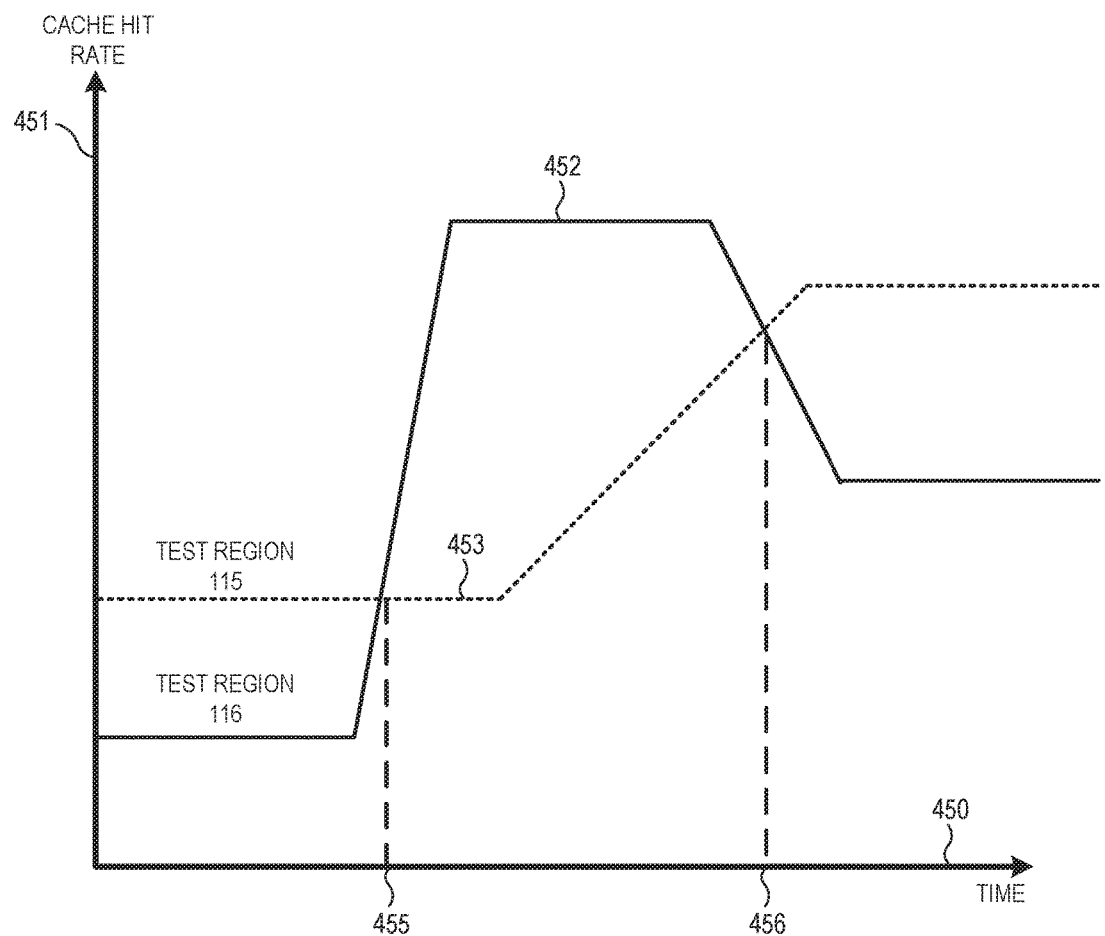
FIG. 4 is a diagram illustrating an example of the processing system of FIG. 1 changing the transfer policy at the non-test region of the cache based on access metrics for test regions of the cache in accordance with some embodiments.

FIG. 4 illustrates a diagram 400 depicting an example of the relative performance of the different test regions 115 and 116 changing over time in accordance with some embodiments. The diagram 400 includes an X-axis 450 representing time and a Y-axis 451 representing cache hit rate. The diagram 400 depicts a curve 452 representing the cache hit rate for the test region 116 over time and a curve 453 representing the cache hit rate for the test region 115.

In the example illustrated by the diagram 400, prior to a time 455 the cache hit rate for the test region 115 is greater than the cache hit rate for the test region 116. Accordingly, prior to time 455 the cache controller 105 applies the transfer policy for the test region 115 to the non-test region 118. At time 455, the relationship between the cache hit rates for the test regions 115 and 116 changes, such that the cache hit rate for the test region 116 is greater than the cache hit rate for the test region 115. In response, the cache controller 105 changes the transfer policy for the non-test region 118 to match the transfer policy for the test region 116. At a later time 456, the relationship between the cache hit rates for the test regions 115 and 116 again changes, such that the cache hit rate for the test region 115 is again greater than the cache hit rate for the test region 116. In response, the cache controller 105 changes the transfer policy for the non-test region 118 to match the transfer policy for the test region 115. Thus, the cache controller 105 changes the transfer policy applied to the non-test region 118 based on changes in the relative performance of the test regions 115 and 116.

Figure 5:
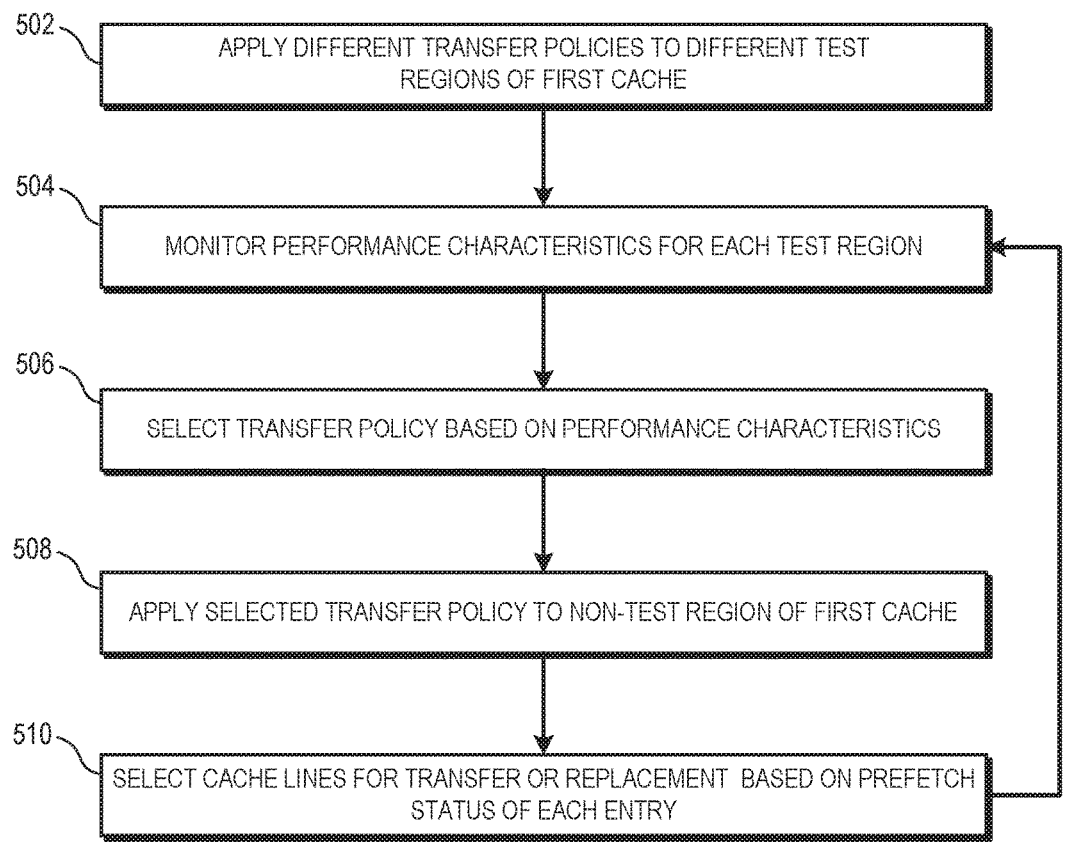
FIG. 5 is a flow diagram of a method of applying a transfer policy to a portion of a cache based on access metrics for different test regions of the cache in accordance with some embodiments.

FIG. 5 is a flow diagram of a method 500 of selecting a transfer policy for a non-test region of a cache based on performance characteristics of different test regions of the cache in accordance with some embodiments. For purposes of description, the method 500 is described with respect to an example implementation at the processing system 100 of FIG. 1. At block 502, the cache controller 105 applies the different transfer policies 111 and 112 to the different test regions 115 and 116 of the cache 110. Thus, for example, the cache controller 105 applies the transfer policy 111 to the test region 115 and the transfer policy 112 to the test region 116. At block 504, the performance monitor 104 monitors and records performance characteristics for the different test regions 115 and 116, such as cache hit rate, cache miss rate, a weighted sum of cache hit rate and cache miss rate, and the like.

At block 506, the cache controller 105 compares the performance characteristics for each of the test regions 115 and 116 and based on the comparison selects one of the transfer polices 111 and 112. For example, the cache controller 105 selects the transfer policy that is applied to the test region that has a higher performance as indicated by the performance characteristics. At block 508, the cache controller 105 applies the selected transfer policy to the non-test region 118 of the cache 110. That is, the cache controller designates cache entries either for transfer or replacement without prior transfer upon eviction at the non-test region 118 in keeping with the requirements of the selected transfer policy. At block 510, the cache controller 105 uses the transfer or replacement designations to either transfer or discard the prefetch data stored at the non-test region 118 of the L2 cache 110 in accordance with a replacement policy non-test region 118 of the L2 cache 110. The method flow returns to block 504, reflecting that the cache controller 105 continues to monitor the performance of the test regions 115 and 116 and based on the performance adjusts the transfer policy applied to the non-test region 118.

In some embodiments, certain aspects of the techniques described above may implemented by one or more processors of a processing system executing software. The software comprises one or more sets of executable instructions stored or otherwise tangibly embodied on a non-transitory computer readable storage medium. The software includes the instructions and certain data that, when executed by the one or more processors, manipulate the one or more processors to perform one or more aspects of the techniques described above. The non-transitory computer readable storage medium may include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media includes, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
   in response to replacing first data at a first cache entry at a first region of a first cache, transferring the first data to a second cache responsive to the first data being prefetched data that has not been a target of a demand request; and
   in response to replacing second data at a second cache entry at a second region of the first cache, discarding the second data from the first cache responsive to the second data being prefetched data that has not been a target of a demand request.

2. The method of claim 1, further comprising:
   measuring a first performance characteristic for the first region of the first cache and a second performance characteristic for the second region of the first cache;
   selecting a first transfer policy for a third region of the first cache based on the first performance characteristic and the second performance characteristic; and
   selectively transferring data at cache entries of the third region of the first cache to the second cache in response to replacing data at cache entries at the third region of the first cache based on the first transfer policy.

3. The method of claim 2, wherein selecting the first transfer policy comprises:
   transferring the data to the second cache with a status indicating that the data is invalid responsive to the data being prefetched data that has not been the target of a demand request.

4. The method of claim 2, wherein selecting the first transfer policy comprises:
   transferring the data to the second cache with a valid status responsive to the data being prefetched data that has not been the target of a demand request.

5. The method of claim 2, wherein selecting the first transfer policy comprises selecting the first transfer policy at a first time, and the method further comprises:
   selecting at a second time a second transfer policy for the third region of the first cache in response to a change in a relationship between the first performance characteristic and the second performance characteristic, the second transfer policy being different from the first transfer policy.

6. The method of claim 2, wherein:
   the first performance characteristic comprises a cache hit rate at the first region of the first cache; and
   the second performance characteristic comprises a cache hit rate at a second region of the first cache.

7. The method of claim 2, wherein:
   the first performance characteristic comprises a cache miss rate at the first region of the first cache; and
   the second performance characteristic comprises a cache miss rate at a second region of the first cache.

8. The method of claim 2, wherein:
   the first performance characteristic comprises a first weighted sum of a cache hit rate at the first region of the first cache and a cache miss rate at the first region of the first cache; and
   the second performance characteristic comprises a second weighted sum of a cache hit rate at a second region of the first cache and a cache miss rate at the second region of the first cache.

9. The method of claim 2, wherein the first performance characteristic and the second performance characteristic are different performance characteristic types.

10. A method, comprising:
    in response to receiving data that requires eviction of a cache entry at a first cache:
      at a first region of the first cache, applying a first transfer policy to select data that was stored at a first cache entry in response to a prefetch request that has not been a target of a demand request to be transferred to a second cache with a status indicating that the data is to be discarded;
      at a second region of the first cache, applying a second transfer policy to select data that was stored at a second cache entry in response to a prefetch request that has not been a target of a demand request to be transferred to the second cache prior to storing the received data at the second cache entry;
      selecting between the first transfer policy and the second transfer policy based on performance characteristics for the first region and the second region to determine a third transfer policy; and
      selectively transferring data at a third region of the first cache to the second cache based on the determined third transfer policy.

11. The method of claim 10, wherein selecting between the first transfer policy and the second transfer policy comprises:
    selecting the first transfer policy for the third region at a first time; and
    selecting the second transfer policy for the third region at a second time.

12. The method of claim 11, wherein the second time is after the first time.

13. The method of claim 11, wherein the second transfer policy for the third region is selected at the second time in response to a change in a relationship between the performance characteristics for the first region and the second region.

14. A processor, comprising:
a first cache comprising a first region and a second region;
a second cache; and
a cache controller configured to:
- at the first region, select a first transfer policy for a first cache entry based on whether data is stored at the first cache entry in response to a prefetch request that has not been a target of a demand request;
- at a second region, select a second transfer policy for cache entries independent of whether data is stored at the cache entries of the second region in response to a prefetch request that has not been a target of a demand request; and
- selectively transfer data at the first region and the second region to the second cache in response to receiving data at the first cache that requires eviction of a cache entry from the first cache based on the selected transfer policies at the first region and the second region.

15. The processor of claim 14, further comprising:
a performance monitor to measure a first performance characteristic for the first region and a second performance characteristic for the second region; and
wherein the cache controller is to:
- select a first transfer policy for a third region of the first cache based on the first performance characteristic and the second performance characteristic; and
- selectively transfer data at cache lines of the third region of the first cache to the second cache in response to receiving data at the first cache that requires eviction of a cache entry from the first cache based on the selected first transfer policy.

16. The processor of claim 15, wherein the first transfer policy is to:
select for replacement data that was stored at a selected first cache entry in response to a prefetch request that has not been the target of a demand request by transferring the selected data to the second cache with a status indicating that the selected data is to be discarded.

17. The processor of claim 15, wherein the second transfer policy is to:
transfer data at a second cache entry to the second cache prior to storing the received data at the second cache entry.

18. The processor of claim 15, wherein the cache controller is to:
select the first transfer policy at a first time; and
select at a second time a second transfer policy for the third region in response to a change in a relationship between the first performance characteristic and the second performance characteristic, the second transfer policy being different from the first transfer policy.

19. The processor of claim 15, wherein:
the first performance characteristic comprises a cache hit rate at the first region; and
the second performance characteristic comprises a cache hit rate at the second region.

20. The processor of claim 15, wherein:
the first performance characteristic comprises a cache miss rate at the first region; and
the second performance characteristic comprises a cache miss rate at the second region.

21. The processor of claim 15, wherein:
the first performance characteristic comprises a first weighted sum of a number of cache hits at the first region and a number of cache misses at the first region; and
the second performance characteristic comprises a second weighted sum of a number of cache hits at the second region and a number of cache misses at the second region.

* * * * *